(12) United States Patent
Minaai et al.

(10) Patent No.: US 7,244,480 B2
(45) Date of Patent: Jul. 17, 2007

(54) GLASS PANEL

(75) Inventors: Tetsuo Minaai, Osaka (JP); Richard Edward Collins, Sydney (AU); Nelson Ng, Sydney (AU)

(73) Assignees: Nippon Sheet Glass Co., Ltd., Osaka (JP); The University of Sydney, Sydney (AU)

( * ) Notice: Subject to any disclaimer, the term of this patent is extended or adjusted under 35 U.S.C. 154(b) by 0 days.

(21) Appl. No.: 10/749,978

(22) Filed: Dec. 30, 2003

(65) Prior Publication Data

US 2004/0157010 A1    Aug. 12, 2004

Related U.S. Application Data

(63) Continuation of application No. PCT/JP02/06760, filed on Jul. 3, 2002, now abandoned.

(30) Foreign Application Priority Data

Jul. 5, 2001    (JP)    ............................. 2001-204547

(51) Int. Cl.
E06B 3/00    (2006.01)
E04C 2/54    (2006.01)
(52) U.S. Cl. .................. 428/34; 428/192; 52/786.1; 52/786.13
(58) Field of Classification Search ............... 428/34, 428/192; 52/786.1, 786.13
See application file for complete search history.

(56) References Cited

U.S. PATENT DOCUMENTS

| | | | |
|---|---|---|---|
| 2,032,003 A | 2/1936 | Clause | |
| 2,193,393 A * | 3/1940 | Danner | 428/34 |
| 4,252,415 A | 2/1981 | Klein et al. | |
| 4,748,137 A * | 5/1988 | Nigrin | 501/46 |
| 5,643,644 A * | 7/1997 | Demars | 428/34 |
| 6,387,460 B1 * | 5/2002 | Shukuri et al. | 428/34 |
| 6,399,169 B1 * | 6/2002 | Wang et al. | 428/34 |
| 6,663,923 B2 * | 12/2003 | Futagami et al. | 428/34 |
| 2003/0108692 A1 * | 6/2003 | Domi et al. | 428/34 |
| 2003/0108693 A1 * | 6/2003 | Futagami et al. | 428/34 |

FOREIGN PATENT DOCUMENTS

| | | |
|---|---|---|
| EP | 0 771 766 A | 5/1997 |
| EP | 1 403 225 A | 3/2004 |
| FR | 921 946 A | 5/1947 |
| JP | 47-047571 B1 | 11/1972 |
| WO | WO99/57074 * | 11/1999 |
| WO | WO 00/58234 A1 | 10/2000 |

* cited by examiner

*Primary Examiner*—Donald J. Loney
(74) *Attorney, Agent, or Firm*—Fulbright & Jaworski LLP

(57) ABSTRACT

A glass panel comprising: a pair of glass sheets (1), (2) disposed in opposition to each other via a gap (V) therebetween, peripheral edges of the two glass sheets (1), (2) being bonded with low melting glass (4) for sealing the gap (V); wherein in a cross section substantially normal to faces of the two glass sheets, (1), (2), an adjacent face (4a) of the low melting glass (4) adjacent the gap (V) has a center portion thereof between the two glass sheets (1), (2) bulging toward the gap (V).

6 Claims, 6 Drawing Sheets

(a) application of low melting glass (b) bonding (c) baking (a) application of low melting glass (b) heating / pressing

GLASS PANEL

CONTINUATION DATA

This application claims priority from Japanese Application No JP2001-204547 filed Jul. 5, 2001, which is a continuation of Internatioal Application PCT/JP02/06760, an international filing date of Jun. 3, 2002, which designated the United States, was amended on Feb. 4, 2003, and is now abandoned.

TECHNICAL FIELD

The present invention relates to a glass panel including a pair of glass sheets disposed in opposition to each other with a gap formed therebetween, peripheral edges of the two glass sheets being bonded with low melting glass for sealing the gap.

BACKGROUND ART

The low melting glass is often used for sealing the gap of such glass panel as above because it has superior adhesive property to e.g. metal solder. Conventionally, the low melting glass in the form of paste would be applied to the peripheral edges of the two glass sheets and heated to 480° C. or higher, thereby to render the low melting glass into melted state. Then, it would be cooled to the normal temperature for solidification, whereby the peripheral edges of the glass sheets were bonded for sealing the gap.

However, since the low melting glass has good adhesive property for the glass sheets, the glass under its melted state also has good wettability to the glass sheets. Then, as shown in FIG. 8, in a cross section substantially normal to the faces of the glass sheets 1, 2, an adjacent face 4b of the low melting glass 4 adjacent the gap V is formed as a concave face with its center portion between the glass sheets 1, 2 extending away from the gap V.

Then, according to the convention, the glass would be cooled and hardened directly under such condition. Hence, in the conventional glass panel, the adjacent face 4b of the low melting glass 4 adjacent the gap V is formed as a concave face with its center portion between the glass sheets 1, 2 extending away from the gap V.

Therefore, with the conventional glass panel, at opposed ends of the adjacent face 4b of the low melting glass 4, there are formed sharp edged portions 4c contacting the glass sheets 1, 2 and projecting toward the gap V. then, for instance, when a wind pressure acts on the faces of the glass sheets, as denoted by arrows in FIG. 8, thereby to apply a force which tends to displace the two glass sheets 1, 2 closer to each other, there occurs stress concentration at the sharp edged portions 4c at the opposed ends of the adjacent face 4b and the two glass sheets 1,2 will tend to be bent in the mutually approaching direction, thus tending to bend the sharp edged portions 4c. As a result, the sharp edged portions 4c would often be cracked and damaged.

Moreover, when the sharp edged portions 4c are damaged, due to the characteristics of the low melting glass vulnerable to brittle fracture, the crack would develop from that damaged portion. For this reason, the conventional glass panel has a shortcoming in the strength of the low melting glass used for bonding and sealing the peripheral edges of the two glass sheets. This shortcoming would appear especially conspicuously with a vacuum double glazing with the gap between the opposed glass sheets being maintained under a depressurized state.

The present invention addresses to such shortcoming of the convention and its object is to provide a glass panel which even when constructed as a vacuum double glazing, can effectively prevent damage in the low melting glass portion thereof by improving the strength of the low melting glass used at the peripheral edges of the two glass sheets.

DISCLOSURE OF THE INVENTION

The characterizing features of a glass panel relating to the present invention are as follows.

A glass panel, as illustrated in FIG. 3 and FIGS. 5-7, includes a pair of glass sheets 1, 2 disposed in opposition to each other via a gap V therebetween, peripheral edges of the two glass sheets 1, 2 being bonded with low melting glass 4 for sealing the gap V, wherein in a cross section substantially normal to faces of the two glass sheets, 1,2, an adjacent face 4a of the low melting glass 4 adjacent the gap V has a center portion thereof between the two glass sheets 1, 2 bulging toward the gap V.

With this construction, in the cross section substantially normal to the faces of the two glass sheets, the adjacent face of the low melting glass adjacent the gap has a center portion thereof between the two glass sheets bulging toward the gap. Hence, even though the construction employs the low melting glass having good adhesive property to the glass sheets, the construction does not have the sharp edged portions which are present in the conventional glass panel, that is, the sharp edged portions which contact the two glass sheets and which project toward the gap. Therefore, there will occur no damage in the sharp edged portions or no development of crack from the damaged portion at all.

And, even when a wind pressure or the like acts on the faces of the glass sheets, tending to displace the glass sheets closer to each other, this stress will be dissipated toward the bulging portion located at the center between the two glass sheets. So, there hardly occurs any stress concentration. Consequently, the strength of the low melting glass at the peripheral edges of the glass sheets can be improved significantly.

According to a glass panel, as illustrated in FIG. 3 and FIGS. 5-7, the adjacent face 4a is formed as a curved face bulging toward the gap V.

With this construction, since the adjacent face is formed as a curved face bulging toward the gap, compared with a construction wherein the adjacent face is formed as a face bulging toward the gap at an acute angle, the above construction can avoid stress concentration even more reliably. Hence, the strength of the low melting glass at the peripheral edges of the glass sheets can be further improved.

According to a glass panel, as illustrated in FIG. 1, spacers 3 are provided in the gap V between the pair of glass sheets 1, 2, the gap V being sealed under a depressurized state.

With this construction, since spacers are provided in the gap between the pair of glass sheets and the gap is sealed under a depressurized state, with the depressurization of the gap, it is possible to provide a glass panel having distinguished thermal insulation performance.

And, with such glass panel, the atmospheric pressure is constantly applied to the faces of its glass sheets, thus causing problem in the strength of the low melting glass. However, as described above, the strength of the low melting glass can be improved. As a result, it is possible to provide a glass panel which has the superior thermal insulation performance and also superior strength.

BEST MODE FOR EMBODYING THE INVENTION

An embodiment of a glass panel relating to the present invention will be described with reference to the accompanying drawings.

Figure 1:
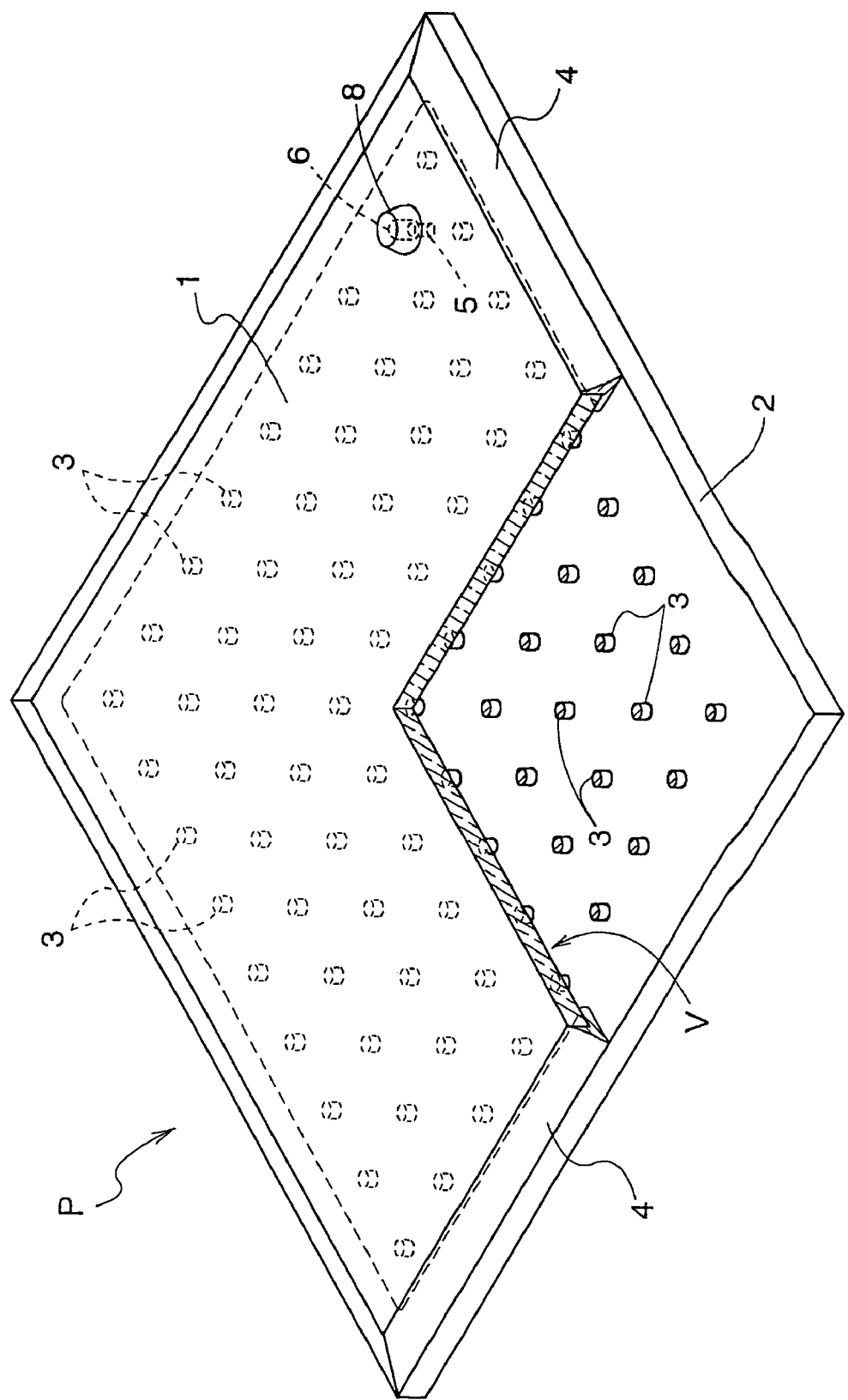
FIG. 1 is a partially cutaway perspective view of a vacuum double glazing.

An example of such glass panel is a double glazing. This double glazing P, as shown in FIG. 1, includes a pair of glass sheets 1,2 and a number of spacers 3 interposed between faces of the two glass sheets 1,2, so that the two glass sheets 1, 2 are disposed in opposition to each other with forming a gap V therebetween. Peripheral edges of the two glass sheets 1,2 are bonded together with a low melting glass 4 which has a lower melting point than the two glass sheets 1, 2 and which also has a low gas permeability, and the gap V between the glass sheets 1, 2 is sealed under a depressurized state.

Each of the two glass sheets 1, 2 employs a transparent float glass sheet having a thickness ranging 2.65 mm to 3.2 mm. And, the gap V between the glass sheets 1, 2 is depressurized to 1.33 Pa ($1.0 \times 10^{-2}$ Torr) or lower.

Figure 4:
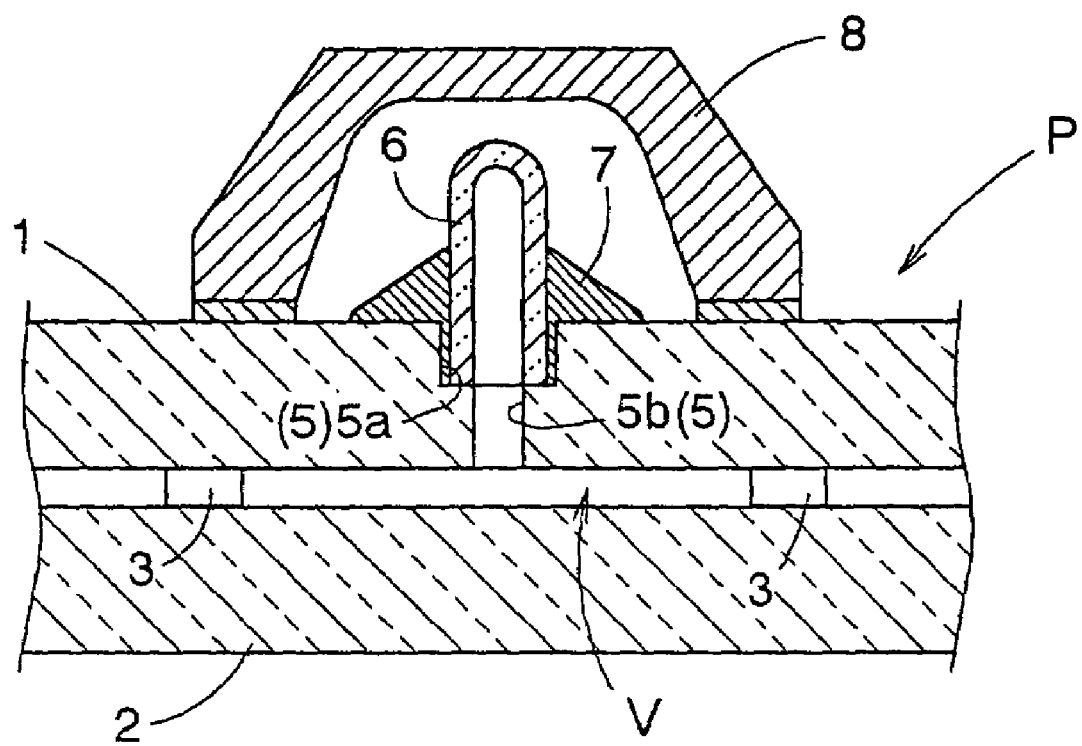
FIG. 4 is a section view showing principal portions of the vacuum double glazing.

Referring to the depressurization of the gap V, though described in details later, for allowing depressurization of the gap V, one glass sheet 1, as shown in FIG. 4 in details, defines an evacuation hole 5 consisting of a large-diameter hole 5a having an approximate diameter of 3 mm and a small-diameter hole 5b having an approximate diameter of 2 mm; and a glass tube 6 is inserted into the large-diameter hole 5a. Then, this glass tube 6 is fixedly bonded to the glass sheet 1 with a low melting glass 7 having a lower melting point than the glass tube 6 and the glass sheet 1 and the leading free end of the glass tube 6 is sealed by means of fusing and the entire tube is covered with a cap 8.

The spacer 3 preferably has a cylindrical shape. And, in order to be able to withstand the atmospheric pressure acting on the two glass sheets 1, 2, the spacer is made of a material having a compression strength of: $4.9 \times 10^8$ Pa ($5 \times 10^3$ kgf/cm$^2$) or higher, such as stainless steel (SUS 304) or Inconel 718.

And, when the spacer 3 has such cylindrical shape, this spacer will have dimensions of: approximate diameter of 0.3 to 1.0 mm and approximate height of 0.15 to 1.0 mm. Further, the inter-distance between adjacent spacers 3 is set to about 20 mm.

Next, the manufacturing process of this vacuum double glazing P will be described.

Figure 5:
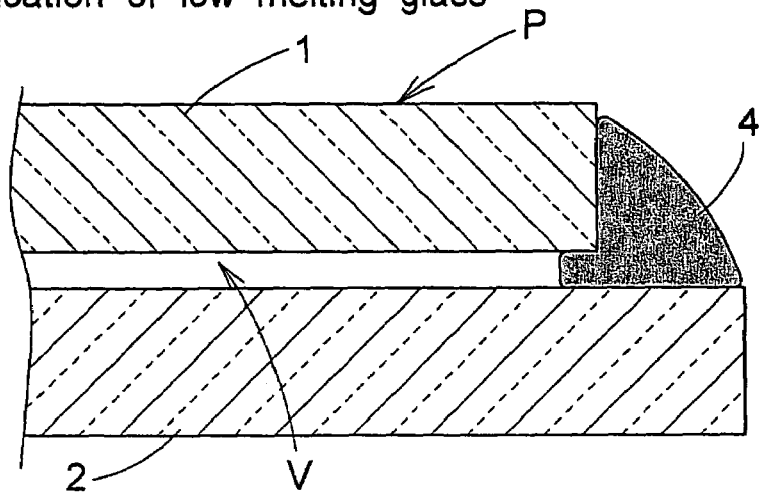
FIG. 5 is a section view showing the principal portions of the vacuum double glazing during the manufacturing process.
Figure 5:
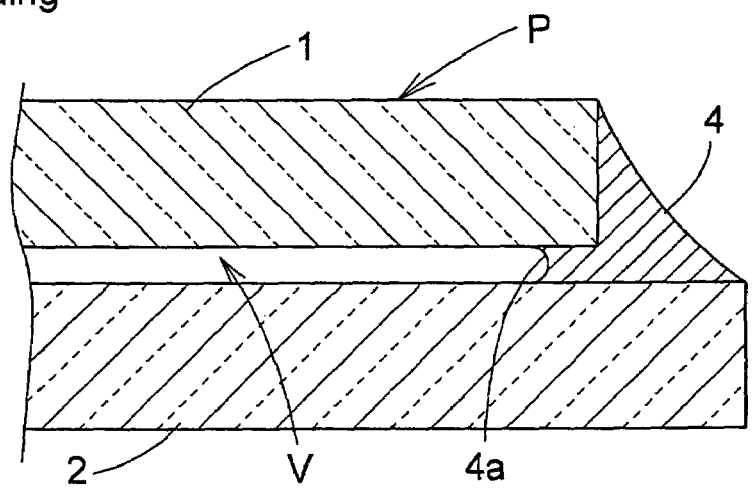
Figure 5:
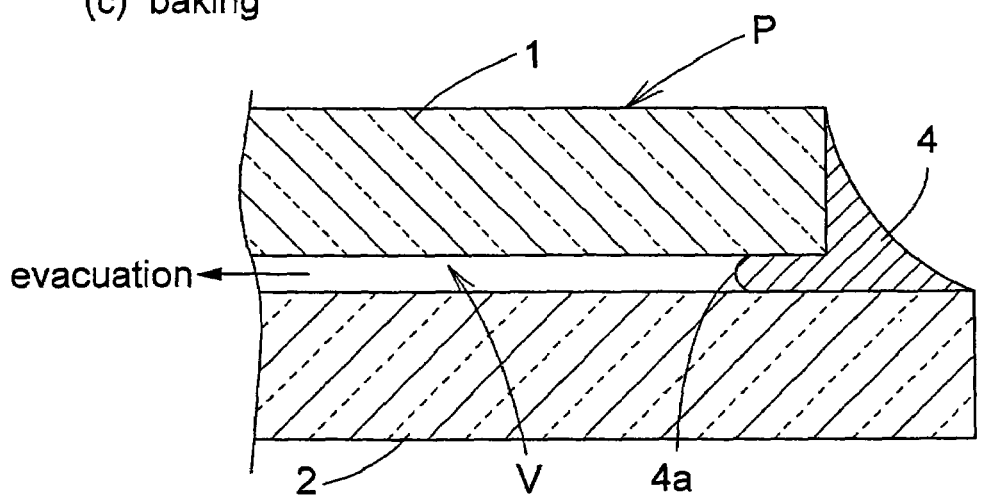

First, of the pair of glass sheets 1, 2, the glass sheet 2 not defining the evacuation hole 5 is supported substantially horizontal and on the top face of its peripheral edge, the low melting glass 4 in the form of paste is applied and also the many spacers 3 are disposed with the predetermined inter-distance therebetween. Then, as shown in FIG. 5(a), the other glass sheet 1 is placed over them from the above.

In the above, as shown, the lower glass sheet 2 may have a slightly larger area so that its peripheral edge may slightly project from the peripheral edge of the upper glass sheet 1. This will be advantageous for e.g. the application of the low melting glass 4.

Figure 2:
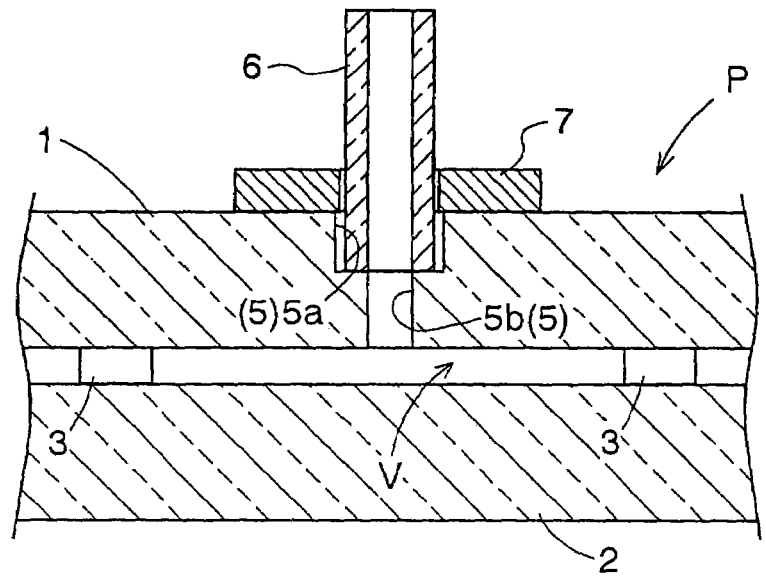
FIG. 2 is a section view showing principal portions of the vacuum double glazing during its manufacturing process.

Thereafter, as shown in FIG. 2, the glass tube 6 is inserted into the evacuation hole 5 of the upper glass sheet 1. As this glass tube 6 can be inserted into only the large-diameter hole 5a of the evacuation hole 5 and has a length greater than that of the large-diameter hole 5a, the upper portion of the glass tube 6 will project from the glass sheet 1. Then, about this projecting portion of the glass tube 6, low melting glass 7 having a doughnut-like shape is fitted and an evacuation sealing device 9 is placed over this assembly.

The evacuation sealing device 9 includes an evacuation cup 10 having a cylindrical shape with a bottom and an electric heater 11 disposed within the evacuation cup 10. The device 9 further includes such components as an evacuation flexible pipe 12 communicated with the inner space of the evacuation cup 10 and an O-ring 13 for sealing relative to the top face of the glass sheet 1.

With the evacuation sealing device 9 placed thereon, the two glass sheets 1, 2 are charged into and housed under substantially horizontal posture in a heating furnace 14. By baking, the low melting glass 4 is molten and with the low melting glass 4 under this molten state, the peripheral edges of the opposed glass sheets 1, 2 are bonded together thereby to seal the gap V. This completes the bonding operation.

Specifically, the temperature inside the heating furnace 14 is elevated to 480° C. or higher for melting the low melting glass 4. In this, as the molten low melting glass 4 has good wettability to the two glass sheets 1, 2, as shown in FIG. 5(b), in a cross section substantially normal to the faces of the two glass sheets 1, 2, an adjacent face 4 of the low melting glass adjacent the gap V will be formed concave relative to the gap V and with the melting of this low melting glass 4, the low melting glass 7 about the glass tube 6 too is melted to flow into the gap between the large-diameter hole 5a and the glass tube 6.

Thereafter, there is effected a baking step for evacuating gas present inside the gap V through the glass tube 6 inserted in the evacuation hole 5, by heating the gap V between the glass sheets 1, 2 with maintaining the temperature inside the heating furnace 14 at 400° C. or higher, which is equivalent to a softened state of the low melting glass 4 when it has a viscosity of $10^{11}$ poise, i.e. a softened state of $10^{10}$ Pascal seconds (Pa·s) or lower, in other words, before its viscosity exceeds $10^{10}$ Pascal seconds (Pa·s), while maintaining the viscosity of the low melting glass 4 at the softened state of $10^{10}$ Pascal seconds (Pa·s) at the same time.

Specifically, by means of evacuation with a rotary pump or a turbo molecular pump connected with the flexible pipe 12, the inside of the evacuation cup 10 is depressurized and also the inside of the vap V is depressurized to 1.33 Pa or lower via the glass tube 6 and the small-diameter hole 5b.

Figure 3:
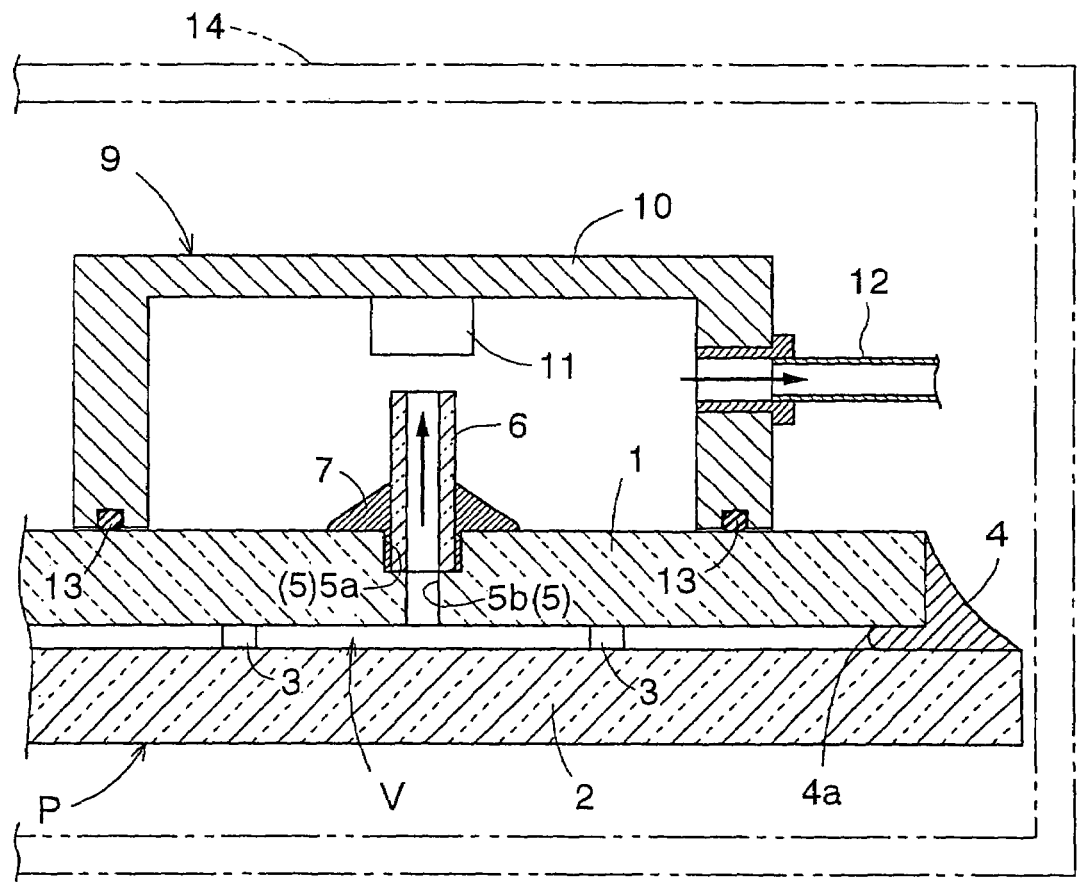
FIG. 3 is a section view of the vacuum double glazing and an evacuation sealing device during the manufacturing process.

When this baking step is being carried out, the low melting glass 4 is under the softened state having the viscosity of $10^{10}$ Pascal seconds (Pa·s). Hence, in association of the depressurization of the gap V, its adjacent face 4a will be formed into a curved face bulging toward the gap V, as shown in FIG. 3 or FIG. 5(c).

Thereafter, by means of the electric heater 11, the leading end of the glass tube 6 is locally heated to about 1000° C., so that the opening of this leading end of the glass tube 6 is sealed, as shown in FIG. 4. After cooling, the cap 8 is bonded to the glass sheet 1, thereby to complete the vacuum double glazing P.

With the vacuum double glazing manufactured in the manner described above, as seen in a cross section substantially normal to the faces of the opposed glass sheets 1, 2, the adjacent face 4a of the low melting glass 4 is formed as the curved face bulging toward the gap V. Therefore, even when the two glass sheets 1, 2 are subjected to a force which tends to displace the sheets closer to each other, as indicated by arrows in FIG. 7, its stress will be dissipated toward the bulging portion, so that substantially no stress concentration will occur. Hence, in comparison with the conventional construction shown in FIG. 8, the strength of the low melting glass 4 can be improved significantly.

In order to confirm the above effect, test samples of this invention's glass panel and the conventional glass panel were made to conduct a comparison experiment therebetween. The results of this experiment will be described next.

First, the test glass panels were made by the following processes (a) and (b).

(a) From a float glass sheet having thickness of 3 mm, a glass sheet A of 600×900 mm (corresponding to the glass sheet 2 of the present embodiment) and a further glass sheet B which is shorter by 6 mm in the vertical and lateral dimensions respectively than the glass sheet A were cut. And, an evacuation hole was formed in the glass sheet B and a glass tube was attached thereto.

(b) The glass sheet A was held substantially horizontal, and on this, a plurality of cylindrical Inconel spacers each having a diameter of 0.6 mm and a height of 0.2 mm were disposed with spacing of 20 mm therebetween. On these, the glass sheet B was placed and on the projecting portion of the glass sheet A projecting by 3 mm from the peripheral edge of the glass sheet B, sealing material (corresponding to the low melting glass 4 of the present embodiment) was placed by using a dispenser.

Thereafter, for manufacturing the test sample of the invention's glass panel, the following steps (c) through (e) were carried out.

(c) The end portions of the two glass sheets A, B immediately above the spacers were clamped together with a spacing of 20 mm by means of clips each having a spring made of hastelloy heat-resistant alloy.

(d) The two glass sheets A, B clamped by the clips were heated to and maintained at 450° C. for 30 minutes and then cooled, so that the peripheral edges of the two glass sheets A, B were sealed and bonded together with the sealing material disposed along the peripheries thereof. In this, when the temperature was lowered to 400° C., the rotary pump connected to the evacuation sealing device set over the glass tube was activated to depressurize the gap between the glass sheets A, B to 0.01 MPa or lower and the temperature was lowered with maintaining the above condition.

(e) When the temperature of the glass sheets A, B reached 320° C., the turbo molecular pump was activated to further depressurize the gap between the glass sheets A, B to 1 Pa or lower and then the assembly was left still for 30 minutes so as to draw out any evaporative impurities adhering to the inner surface. Thereafter, the opening at the leading end of the glass tube was sealed and then the assembly was cooled to the room temperature.

On the other hand, the test sample of the conventional glass panel was manufactured by the following step (f), instead of the above-described steps (c) through (e).

(f) Without using the clips as the above step (c), the two glass sheets A, B were heated to and maintained at 450° C. for 30 minutes and then cooled so that the peripheral edges of the glass sheets A, B were sealed and bonded with the sealing material provided along the peripheries. In the course of this, when the temperature dropped to 320° C., by means of the rotary pump and the turbo molecular pump connected to the evacuation sealing device, the gap between the two glass sheets A, B was depressurized to 1 Pa or lower and left still for 30 minutes so that any evaporative impurities adhering to the inner surface may be drawn out. Then, the opening at the leading end of the glass tube was sealed and the assembly was cooled to the room temperature.

That is to say, the test sample of the invention was manufactured by the above-described steps (a) through (e), whereas the test sample of the convention was manufactured by the above steps (a), (b) and (f). Then, on the sealed portions of these two kinds of test samples, their shapes were observed.

Figure 7:
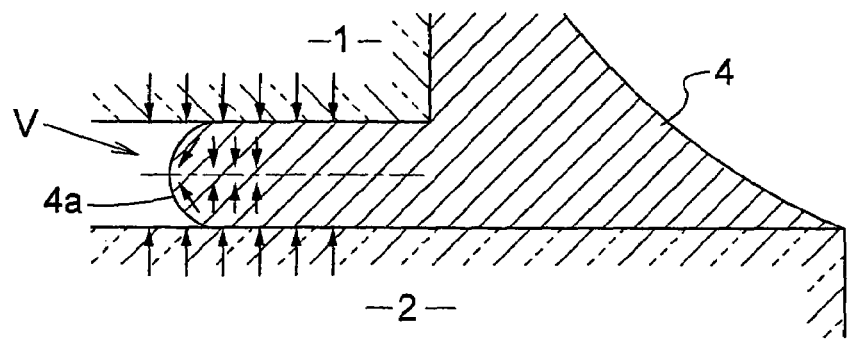
FIG. 7 is a section showing principal portions of the vacuum double glazing illustrating its functions.
Figure 8:
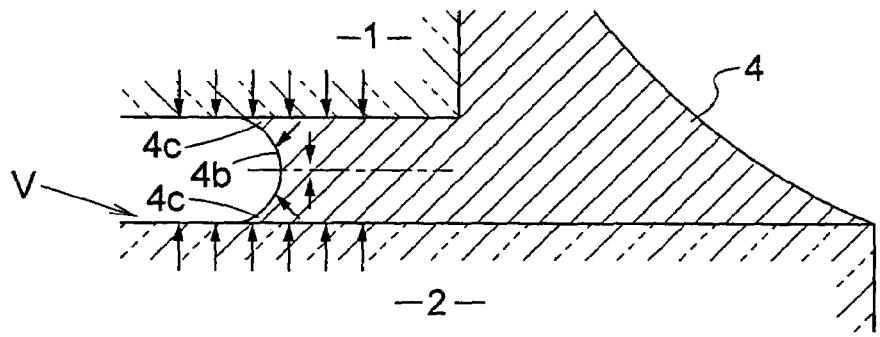
FIG. 8 is a section view showing principal portions of a conventional vacuum double glazing illustrating functions thereof.

The observation confirmed that in the test sample of the invention, in the cross section thereof substantially normal to the faces of the glass sheets A, B, the face of the sealed portion adjacent the gap was formed as a curved face bulging toward the gap as shown in FIG. 7, whereas, in the test sample of the convention, the face of the sealed portion adjacent the gap was formed as a curved face recessed toward the gap as shown in FIG. 8.

Figure 9:
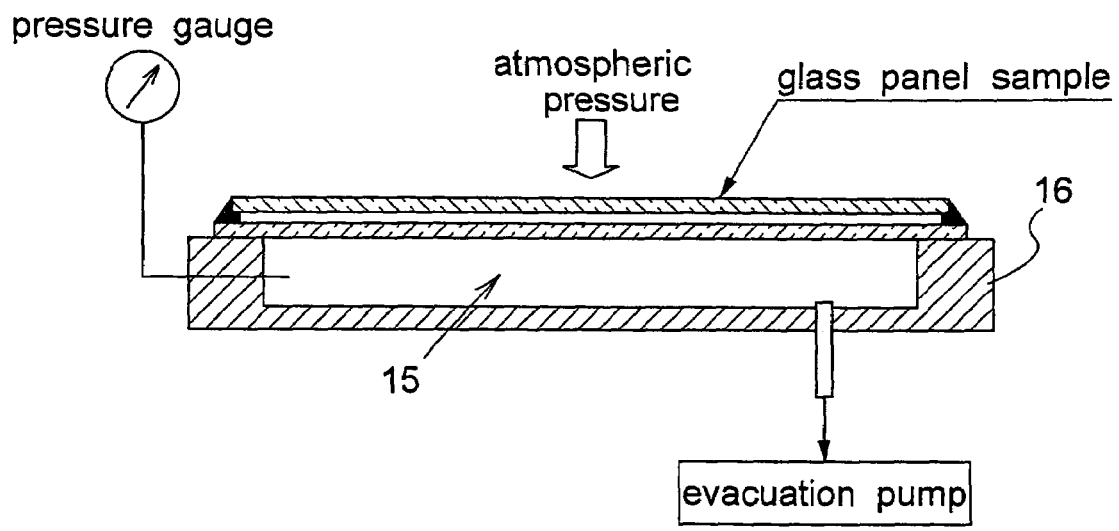
FIG. 9 is an explanatory view of a device used in a comparison experiment.

Next, as shown in FIG. 9, a testing form panel 16 allowing depressurization of its inside 15 was prepared and on this form panel 16, the two kinds of test samples were mounted. And, as a simulation of a wind load, the inside 15 of the form panel 16 was progressively depressurized by means of an evacuation pump to achieve a pressure difference of 0 to −20 kPa relative to the atmospheric pressure. In the course of this, the destruction condition was monitored and the pressure of the inside 15 at the very moment of start of destruction was determined.

As a result, in the case of the invention's test sample, of total 25 samples of them made, in all of these 25 samples, destruction started from the glass faces of the glass sheets, when the average pressure of the inside 15 of the form frame 16 was −14.5 kPa.

On the other hand, in the case of the convention's test sample, of total 28 samples of them made, in 22 samples, the destruction started from the glass faces of the glass sheets, when the average pressure of the inside 15 was −14.1 kPa. Whereas, in the other 6 samples thereof, the destruction started from the vicinity of the sealed portion at the end, when the average pressure of the inside 15 was −8.5 kPa.

From the above results, when the destruction started from the glass faces of the glass sheets, no distinguished difference was observed in the average pressure of the inside 15 between the two kinds of test samples.

However, in the case of the convention's test sample, of the total 28 samples thereof, in 6 samples, that is, in the ratio of about 21%, the start of destruction was observed from the vicinity of the sealed portion at the ends, whereas, in the case of the invention's test samples, such destruction from the vicinity of the sealed portion was not observed at all.

That is to say, when the inside 15 is depressurized with using the form frame 16 shown in FIG. 9, the load due to the atmospheric pressure is applied substantially uniformly to the top side of the test sample, so that the test sample will be warped in an arcuate form with its lower side being formed as a convex face downwards. In this, the stress occurs not only on the faces of the glass sheets, but also on the interfaces between the sealed portion and the glass sheet at the end portions of the two glass sheets. Hence, if the sealed portion at the ends of the two glass sheets has structural weakness, the destruction will start earlier at the vicinity of the sealed portion than on the glass faces. On the other hand, if the sealed portion at the ends is strong, the destruction will start earlier at the glass faces. Therefore, the above-described results establish that the glass panel of the invention is superior in strength to the conventional glass panel.

OTHER EMBODIMENTS

Figure 6:
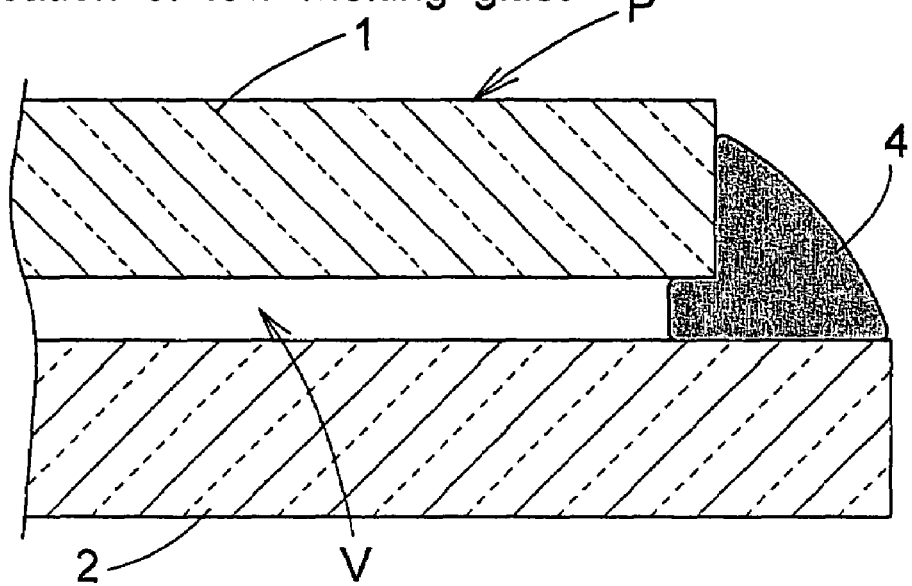
FIG. 6 is a section view showing principal portions of a vacuum double glazing during its manufacturing process relating to a further embodiment
Figure 6:
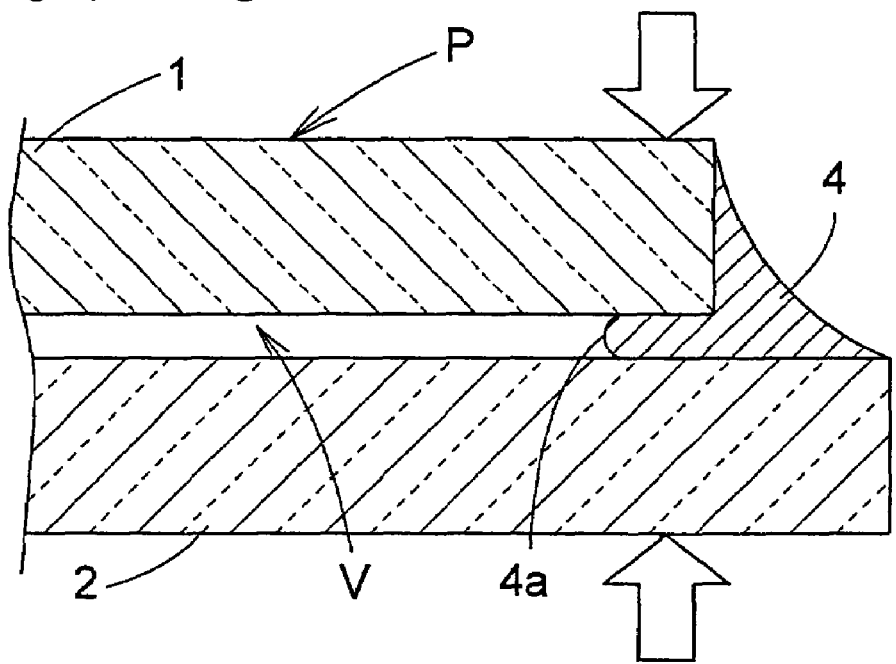

<1> In the foregoing embodiment, by effecting the baking step for evacuating and eliminating gas from the gap V between the two glass sheets 1, 2, the adjacent face 4a of the low melting glass 4 was formed into the curved face bulging toward the gap V. Instead, after application of the low-melting glass 4 thereto as shown in FIG. 6(a), in the heated softened state of the low melting glass 4, as shown in FIG. 6(b), a pressing operation may be effected for pressing at least the peripheral edges of the two glass sheets 1, 2 to be closer to each other and with maintaining this pressing, the low melting glass 4 may be allowed to cool so as to cause the adjacent face 4a of the low melting glass 4 to be bulged toward the gap V. Further, by using the pressing operation and the baking operation in combination, the adjacent face 4a of the low melting glass 4 may be formed into the curved face bulging toward the gap V.

Moreover, this adjacent face 4a need not necessarily be formed into such curved face. Instead, for instance, it may be bulged toward the gap V in the form of e.g. a trapezoid or a triangle. Further, regarding the timing of effecting this bulging process also, after effecting the bonding step, the low melting glass 4 may be once cooled to the room temperature and then this glass 4 may be heated again to its softened state and the above-described bulging step may be carried out then.

<2> The foregoing embodiment disclosed the vacuum double glazing P as an example of the glass panel. However, the invention may be applied also to e.g. manufacture of a plasma display panel including a pair of glass sheets 1, 2 and a gap V therebetween charged with a predetermined gas. In such case, the predetermined gas will be charged into the gap V after effecting the baking step.

Further, regarding the use of the glass panel, it can be used in various applications, such as a window pane for a building or a vehicle (automobile, railway car, boat) or instruments such as a plasma display or a door or a wall of various machines such as a refrigerator, a thermal insulator, etc.

Therefore, the glass sheets 1, 2 constituting the glass panel P are not limited to the float glass sheets described in the foregoing embodiment. Depending on its use and application of the glass panel P, it may be a figured glass, frosted glass provided with the function of diffusing light through a surface treatment, mesh glass, a wired glass, a reinforced glass, double-reinforced glass, low reflection glass, high transmission glass sheet, ceramic printed glass, special glass provided with a function of heat absorption, UV absorption, etc. or any combination of these. Further, the composition of the glass may be soda silica glass, soda lime silica glass, borosilicate glass, aluminosilicate glass, various kinds of crystallized glass. And, the thickness of the glass sheets 1, 2 too may be freely selected as appropriate.

Also, the material of the spacer 3 is not limited to the stainless steel or Inconel. Instead, it may be a metal such as iron, copper, aluminum, tungsten, nickel, chromium, titanium, an alloy such as carbon steel, chromium steel, nickel steel, nickel-chrome steel, manganese steel, chromium-manganese steel, chrome molybdenum steel, silicon steel, brass, solder, duralumin, etc, ceramics, or glass. In short, any material may be used if it is hardly deformed by an external force. And, its shape too is not limited to the cylindrical shape, but may be a variety of shapes such as angular column-like shape or spherical shape, etc.

Further, regarding the low melting glass 7 for fusing the glass tube 6, it is also possible to employ a crystalline low melting glass which completes its crystallization at a high temperature range or a non-crystalline low melting glass. Similarly, regarding the low melting glass 4 for bonding and sealing the peripheral edges of the two glass sheets 1, 2, it is possible to employ either crystalline or non-crystalline low melting glass.

INDUSTRIAL APPLICABILITY

The glass panel of the present invention can be used in various applications, such as a window pane for a building or a vehicle (automobile, railway car, boat) or instruments such as a plasma display or a door or a wall of various machines such as a refrigerator, a thermal insulator, etc.

The invention claimed is:
1. A vacuum glass panel comprising:
a pair of glass sheets, wherein each said glass sheet has one peripheral edge,
opposed to each other across a gap and joined with each other through low temperature melting glass, having a viscosity of $10^{10}$ Pascal seconds (Pa·s) or less under a melted condition, at each said peripheral edge thereof to seal said gap;
a number of spacers provided in said gap between the glass sheets, said gap being sealed under an evacuated condition of 1.33 Pa or less;
wherein said low temperature melting glass is heated and softened to said melted condition in which gas is suctioned from said gap for obtaining the evacuated condition after the low temperature melting glass is applied to each said peripheral edge, thereby allowing adjacent inner faces of the low temperature melting glass facing the gap to progressively bulge into the gap toward central regions of the glass sheets in a sectional view substantially perpendicular to planes of the glass sheets; and to form concave edges on the outer faces of the low temperature melting glass facing away from the gap.
2. A vacuum glass panel comprising:
a pair of glass sheets, wherein each said glass sheet has one peripheral edge,
opposed to each other across a gap and joined with each other through low temperature melting glass, having a viscosity of $10^{10}$ Pascal seconds (Pa·s) or less under a melted condition, at each said peripheral edge thereof to seal said gap;
a number of spacers provided in said gap between the glass sheets, said gap being sealed under an evacuated condition of 1.33 Pa or less;

wherein said low temperature melting glass is heated and softened to said melted condition in which each said peripheral edge of the glass sheets are pressed to bring them closer to each other after the low temperature melting glass is applied to each said peripheral edge, thereby allowing adjacent inner faces of the low temperature melting glass facing the gap to progressively bulge into the gap toward central regions of the glass sheets in a sectional view substantially perpendicular to planes of the glass sheets, and to form concave edges on the outer faces of the low temperature melting glass facing away from the gap.

3. The vacuum glass panel according to claim 1, wherein said adjacent faces each comprises a curved face bulging into said gap.

4. The vacuum glass panel according to claim 2, wherein said adjacent faces each comprises a curved face bulging into said gap.

5. A vacuum glass panel comprising:

a pair of glass sheets wherein each glass sheet has one peripheral edge, opposed to each other across a gap and joined with each other through low temperature melting glass at each peripheral edge thereof to seal said gap under an evacuated condition of 1.33 Pa or less;

wherein adjacent faces of the low temperature melting glass facing to the gap bulge into the gap toward central regions of the glass sheets in a sectional view substantially perpendicular to planes of the glass sheets; and outer faces of the low temperature melting glass are concave and facing away from the gap.

6. The vacuum glass panel according to claim 5, wherein said adjacent faces each comprises a curved face bulging into said gap.

* * * * *